United States Patent
Hsieh et al.

(10) Patent No.: US 11,197,338 B2
(45) Date of Patent: Dec. 7, 2021

(54) POWER SAVING RADIO RESOURCE MANAGEMENT (RRM) MEASUREMENTS IN A WIRELESS NETWORK

(71) Applicant: MediaTek Inc., Hsinchu (TW)

(72) Inventors: Chi-Hsuan Hsieh, Hsinchu (TW); Wei-De Wu, Hsinchu (TW); Din-Hwa Huang, Hsinchu (TW); Kuan-Lin Chen, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 16/669,990

(22) Filed: Oct. 31, 2019

(65) Prior Publication Data

US 2020/0146095 A1 May 7, 2020

Related U.S. Application Data

(60) Provisional application No. 62/754,693, filed on Nov. 2, 2018.

(51) Int. Cl.
*H04W 4/00* (2018.01)
*H04W 76/27* (2018.01)
(Continued)

(52) U.S. Cl.
CPC .......... *H04W 76/27* (2018.02); *H04W 24/10* (2013.01); *H04W 52/0229* (2013.01);
(Continued)

(58) Field of Classification Search
CPC ... H04W 76/27; H04W 56/001; H04W 76/28; H04W 52/52; H04W 52/0229;
(Continued)

(56) References Cited

U.S. PATENT DOCUMENTS 9,408,121 B2   8/2016 Xiao
9,872,252 B1 * 1/2018 Ang ................ H04W 52/0229
(Continued)

FOREIGN PATENT DOCUMENTS

EP     3562239 A1   10/2019
WO  2018172996 A1    9/2018
WO  2018127205 A1   12/2018

OTHER PUBLICATIONS

The International Search Report and the Written Opinion for PCT/CN2019/115086 dated Feb. 12, 2020.

*Primary Examiner* — Marceau Milord
(74) *Attorney, Agent, or Firm* — Tong J. Lee

(57) ABSTRACT

A UE in a wireless network performs RRM measurements according to power saving schemes. The UE receives Synchronization Signal Blocks (SSBs), which are broadcast periodically from a base station to a cell served by the base station, and receives additional signal blocks transmitted periodically from the base station. The additional signal blocks and the SSBs use different time-and-frequency resources. The UE performs an RRM measurement according to information received within an RRM measurement window including at least one of the additional signal blocks and a corresponding one of the SSBs. Additionally or alternatively, the UE performs RRM measurements on SSBs with a first cycle period equal to a Discontinuous Reception (DRX) cycle period. In response to an indication that a predefined condition for the RRM measurements is satisfied, the UE performs the RRM measurements with a second cycle period which is at least two times of the first cycle period.

10 Claims, 8 Drawing Sheets

(51) Int. Cl.
*H04W 56/00* (2009.01)
*H04W 76/28* (2018.01)
*H04W 52/52* (2009.01)
*H04W 52/02* (2009.01)
*H04W 24/10* (2009.01)

(52) U.S. Cl.
CPC ......... *H04W 52/52* (2013.01); *H04W 56/001* (2013.01); *H04W 76/28* (2018.02)

(58) Field of Classification Search
CPC . H04W 24/10; H04W 68/005; H04W 72/005; H04W 72/1289; H04W 4/80
USPC ........................................ 370/329, 331, 342
See application file for complete search history.

(56) References Cited

U.S. PATENT DOCUMENTS

| | | | |
|---|---|---|---|
| 9,986,473 B2* | 5/2018 | Wu | H04W 36/0083 |
| 10,652,064 B2* | 5/2020 | Liu | H04L 27/06 |
| 2009/0203376 A1* | 8/2009 | Sambhwani | H04W 52/0216 455/434 |
| 2010/0330992 A1* | 12/2010 | Bhattacharjee | H04W 52/028 455/436 |
| 2010/0331019 A1* | 12/2010 | Bhattacharjee | H04W 52/0229 455/458 |
| 2012/0115552 A1* | 5/2012 | Bhattacharya | H04B 1/1607 455/574 |
| 2012/0252368 A1* | 10/2012 | Edara | H04W 36/0088 455/67.11 |
| 2013/0242774 A1* | 9/2013 | Wang | H04W 48/18 370/252 |
| 2013/0244647 A1* | 9/2013 | Makh | H04W 48/16 455/434 |
| 2013/0244657 A1* | 9/2013 | Wang | H04W 36/0085 455/436 |
| 2014/0003257 A1* | 1/2014 | Chin | H04W 24/10 370/252 |
| 2014/0315555 A1* | 10/2014 | Zhang | H04W 36/0094 455/437 |
| 2015/0181641 A1* | 6/2015 | Farajidana | H04W 52/0216 370/311 |
| 2017/0026948 A1* | 1/2017 | Yang | H04W 72/0406 |
| 2017/0208619 A1* | 7/2017 | Yang | H04W 72/1284 |
| 2018/0270792 A1 | 9/2018 | Park | |
| 2018/0279238 A1* | 9/2018 | Zhou | H04L 5/0048 |
| 2019/0150042 A1* | 5/2019 | Srivastava | H04W 36/0061 455/436 |
| 2019/0254110 A1* | 8/2019 | He | H04L 5/0048 |
| 2019/0289513 A1* | 9/2019 | Jeon | H04W 72/0453 |
| 2019/0297577 A1* | 9/2019 | Lin | H04W 52/0235 |
| 2019/0320490 A1* | 10/2019 | Liu | H04W 52/0216 |
| 2019/0327123 A1 | 10/2019 | Wang | |
| 2019/0349170 A1* | 11/2019 | Li | H04L 5/0094 |
| 2019/0379431 A1 | 12/2019 | Park et al. | |
| 2020/0145169 A1* | 5/2020 | Zhou | H04B 1/713 |
| 2020/0367234 A1* | 11/2020 | Bergstrom | H04L 5/0048 |

* cited by examiner

POWER SAVING RADIO RESOURCE MANAGEMENT (RRM) MEASUREMENTS IN A WIRELESS NETWORK

CROSS-REFERENCE TO RELATED APPLICATIONS

This application claims the benefit of U.S. Provisional Application No. 62/754,693 filed on Nov. 2, 2018, the entirety of which is incorporated by reference herein.

TECHNICAL FIELD

Embodiments of the invention relate to wireless communications; more specifically, to power saving schemes for a User Equipment (UE) to perform Radio Resource Management (RRM) measurements.

BACKGROUND

The Fifth Generation New Radio (5G NR) is a telecommunication standard for mobile broadband communications. 5G NR is promulgated by the 3rd Generation Partnership Project (3GPP) to significantly improve on performance metrics such as latency, reliability, throughput, etc.

A User Equipment (UE) in a 5G NR network periodically measures the quality of received signals, such as Reference Signal Received Power (RSRP) or Reference Signal Received Quality (RSRQ). These measurements, referred to as the Radio Resource Management (RRM) measurements, are reported back to a base station for resource management. RRM enables a wireless network to efficiently utilize its limited radio frequency resources. RRM measurements can be used for the management of limited radio frequency resources to enhance the performance of wireless connections and mobility operations, such as handover. Based on the RRM measurements, a base station configures parameters such as transmit power, user allocation, beamforming, data rates, handover criteria, modulation scheme, error coding scheme, etc.

However, performing RRM measurements consumes power. A common goal in operating a wireless network is to achieve high communication performance with energy efficiency. Energy efficiency is especially a concern for a battery-powered UE which needs to conserve battery power. Thus, there is a need for reducing power consumption in an RRM measurement process.

SUMMARY

In one embodiment, a method is provided for a UE in a wireless network to perform RRM measurements. The method comprises: receiving Synchronization Signal Blocks (SSBs), which are broadcast periodically from a base station to a cell served by the base station, and receiving additional signal blocks transmitted periodically from the base station. The additional signal blocks and the SSBs use different time-and-frequency resources. The method further comprises performing an RRM measurement according to information received within an RRM measurement window including at least one of the additional signal blocks and a corresponding one of the SSBs.

In another embodiment, a method is provided for a UE in a wireless network to perform RRM measurements. The method comprises: performing RRM measurements on SSBs with a first cycle period equal to a Discontinuous Reception (DRX) cycle period. The SSBs are broadcast periodically from a base station. In response to an indication that a predefined condition for the RRM measurements is satisfied, the method further comprises performing the RRM measurements with a second cycle period which is at least two times of the first cycle period.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
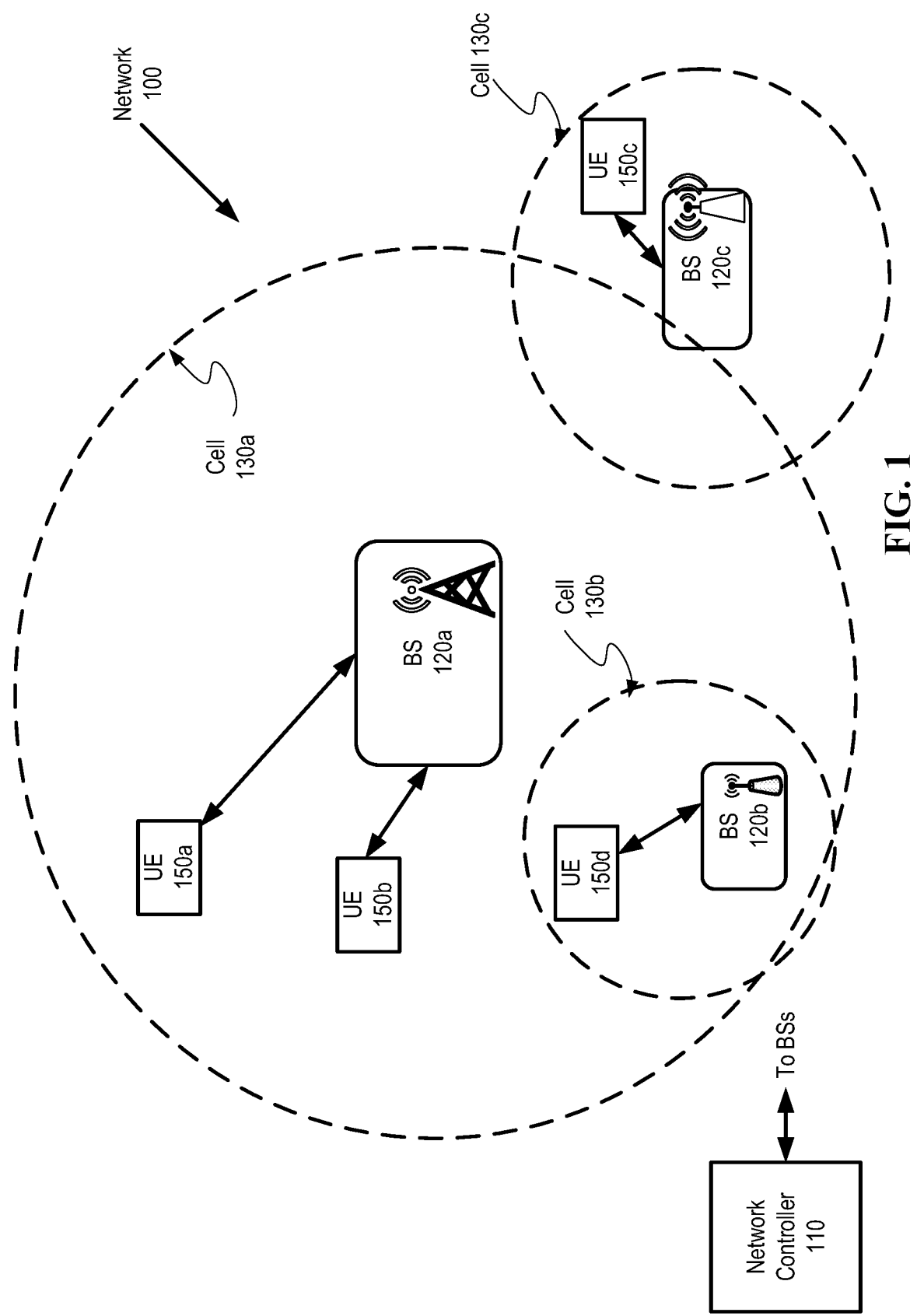
FIG. 1 is a diagram illustrating a network in which the embodiments of the present invention may be practiced.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Disclosed herein are power saving schemes for a UE to perform RRM measurements based on received synchronization signal blocks (SSBs). The UE performs RRM measurements periodically to determine received signal power and/or quality. SSB-based RRM measurements are described in detail in 3GPP Specifications, such as 3GPP TS 38.133 V15.3.0, "5G; NR; Requirements for support of radio resource management" (2018 October).

In a first approach, the time length of each RRM measurement window is reduced with the help of the network system. Since a UE has to wake up to perform RRM measurements, reducing the RRM measurement window means that the UE's wake-up time is also reduced, thereby saving power. The RRM measurement is performed based on SSBs and additional signal blocks transmitted from a base station, where the time-and-frequency resources used by the additional signal blocks are different from those used by the SSBs.

The term "time-and-frequency resources" referred to a combination of time resources (e.g., symbol time) and frequency resources (e.g., frequency channels such as one or more subcarriers or resource blocks). Thus, different time-and-frequency resources may mean different symbol times and the same frequency channel, the same symbol time and different frequency channels, or different symbol times and different frequency channels. The term "different" with respect to time/frequency may indicate partially overlapping time/frequency or non-overlapping time/frequency.

The use of both SSBs and the additional signal blocks enables the UE to reduce the time window (referred to as an RRM measurement window) for completing each cycle of the RRM measurement, compared with using SSBs alone. Completing each cycle of RRM measurement in less time allows an idle mode UE to remain in a deep sleep state longer to save power. For a connected mode UE, compacting the measurement in time can increase the efficiency of resource usage to thereby save power.

In a second approach, the RRM measurement cycle period may be relaxed to save power. Specifically, the cycle period of the RRM measurements is lengthened when a predefined condition is satisfied. Lengthening the cycle period can reduce the overhead incurred by the RRM measurements and thereby save UE power.

According to the embodiments described herein, the UE operates in a wireless network according to standards that are based on, compatible with, or extensions of 5G NR. The disclosed power saving schemes may be applied to RRM measurements by a UE on downlink transmissions from a base station (known as gNodeB or gNB in a 5G network). In some examples, downlink transmissions may include transmissions of downlink control information, reference signals, synchronization signals, etc. Downlink signals may be modulated by multiple sub-carriers (e.g., waveform signals of different frequencies) according to various radio technologies.

FIG. 1 is a diagram illustrating a network 100 in which the embodiments of the present invention may be practiced. The network 100 is a wireless network which may be a 5G NR network. To simplify the discussion, the methods and apparatuses are described within the context of a 5G NR network. However, one of ordinary skill in the art would understand that the methods and apparatuses described herein are applicable to a variety of other multi-access technologies and the telecommunication standards that employ these technologies.

The number and arrangement of components shown in FIG. 1 are provided as an example. In practice, the network 100 may include additional devices, fewer devices, different devices, or differently arranged devices than those shown in FIG. 1.

Referring to FIG. 1, the network 100 may include a number of base stations (BSs), such as BSs 120a, 120b, and 120c, collectively referred to as the BSs 120. In some network environments such as a 5G NR network, a BS may be known as a gNodeB, a gNB, and/or the like. In an alternative network environment, a BS may be known by other names. Each BS 120 serves (i.e., provides communication coverage for) a particular geographic area known as a cell, such as a cell 130a, 130b or 130c, collectively referred to as cells 130. The radius of a cell size may range from several kilometers to a few meters. A BS may communicate with one or more other BSs or network entities directly or indirectly via a wireless or wireline backhaul.

A network controller 110 may be coupled to a set of BSs such as the BSs 120 to coordinate, configure, and control these BSs 120. The network controller 110 may communicate with the BSs 120 via a backhaul.

The network 100 further includes a number of user equipment terminals (UEs), such as UEs 150a, 150b, 150c and 150d, collectively referred to as the UEs 150. The UEs 150 may be anywhere in the network 100, and each UE 150 may be stationary or mobile. The UEs 150 may also be known by other names, such as a mobile station, a subscriber unit, and/or the like. Some of the UEs 150 may be implemented as part of a vehicle. Examples of the UEs 150 may include a cellular phone (e.g., a smartphone), a wireless communication device, a handheld device, a laptop computer, a cordless phone, a tablet, a gaming device, a wearable device, an entertainment device, a sensor, an infotainment device, Internet-of-Things (IoT) devices, or any device that can communicate via a wireless medium.

In one embodiment, the UEs 150 may communicate with their respective BSs 120 in their respective cells 130. The transmission from a UE to a BS is called uplink transmission, and from a BS to a UE is called downlink transmission.

Figure 2:
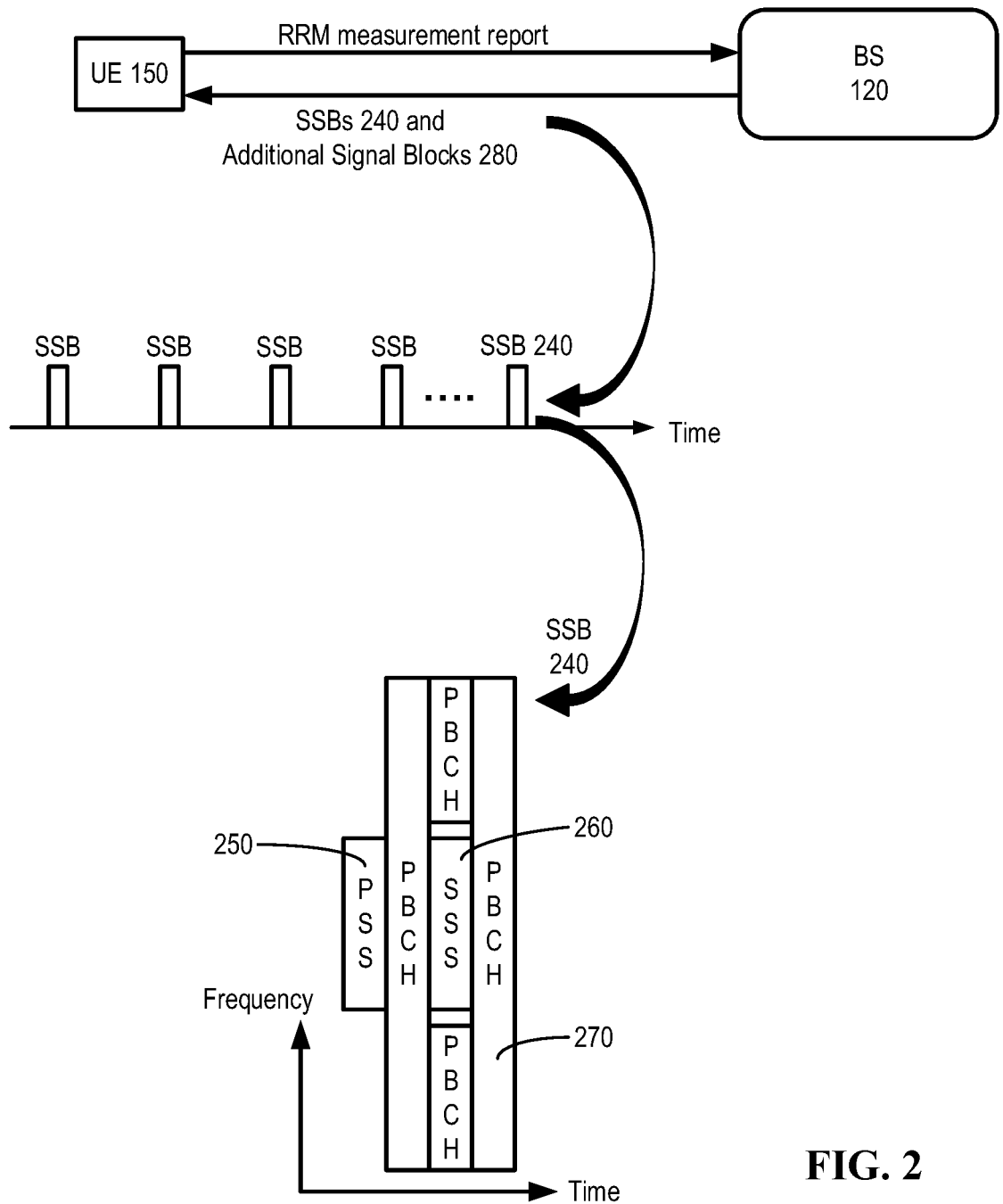
FIG. 2 is a schematic diagram illustrating information exchanges between a UE and a base station according to one embodiment.

FIG. 2 is a schematic diagram illustrating information exchanges between the UE 150 and the BS 120 according to one embodiment. The UE 150 and the BS 120 may be any of the UEs and BSs, respectively, described in connection with FIG. 1. In one embodiment, the UE 150 is configured to perform RRM measurements using a sequence of SSBs 240 and a sequence of additional signal blocks 280. The BS 120 periodically broadcasts the SSBs 240 specifically to the cell that the BS 120 serves; that is, the SSBs 240 are cell-specific. Each SSB 240 carries system information to the UEs in the cell identified by a Cell ID. The UEs can find out in which cell they are located by decoding the Cell ID in the received SSB 240.

FIG. 2 further illustrates that each SSB 240 is composed of a Primary Synchronization Signal (PSS) 250, a Secondary Synchronization Signal (SSS) 260 and a Physical Broadcast Channel (PBCH) 270. With Orthogonal Frequency-Division Multiplexing (OFDM), PSS 250 occupies symbol 0, PBCH 270 at symbols 1, 2, 3 and SSS 260 at symbol 2. The BS 120 broadcast SSBs 240 periodically to the UEs in its cell. The periodicity (i.e., the cycle period) of the SSBs 240 may be configured by the BS; e.g., 20 milliseconds (ms), 40 ms, etc. The BS 120 may inform configuration parameters of the SSBs 240 to the UE 120 via Radio Resource Control (RRC) signals.

The UE 150 identifies a Cell ID from PSS 250 and SSS 260, and decodes basic system information from PBCH 270, such as frame, slot, and symbol timing. According to the system information, the UE 150 can perform random access to the radio frequency (RF) resources. Time synchronization (in terms of symbol-level and slot-level) and frequency synchronization can also be realized via PSS 250 and SSS 260. The UE 150 may perform RRM measurements periodically on a subset of the SSBs 240, e.g., according to configured RRM measurement timing; e.g., the RRM measurement window and cycle period.

Before describing the embodiments of the invention, it is helpful to describe an existing power saving technique utilized by the UEs in a 5G NR network. A connected mode UE is a UE in active data communication with the BS. When there is no data communication to/from the UE, the UE may enter an idle mode to save power. Both the connected mode UEs and the idle mode UEs perform periodic RRM measurements, but only the connected mode UEs report the measurement results back to their corresponding BSs. The reported RRM measurement may be an average value of multiple measurements.

To further conserve power, a Discontinuous Reception (DRX) mechanism may be activated for UEs in both the connected mode and the idle mode. With the DRX mechanism activated, a UE monitors the downlink channel in the "DRX ON" duration, and enters a sleep state (e.g., by switching off most of its circuitry) when DRX is not on. The DRX ON duration is periodic. The cycle period of the DRX ON duration (also referred to as the DRX cycle period) and the DRX ON duration window are configurable parameters controlled by the network. A connected mode UE may have a short DRX cycle period while an idle mode UE may have a long DRX cycle period; that is, an idle mode UE can stay asleep longer than a connected mode UE. To further reduce power consumption, the idle mode DRX cycle period of some UEs (e.g., low-end NR devices such as IoT sensors) may be extended up to several minutes such that these UEs can go into a deep sleep while staying registered with the network. When the DRX mechanism is activated, a UE performs RRM measurements periodically whether or not it is in the DRX ON duration.

Embodiments of the invention described herein provide power saving methods for a UE to perform RRM measurements. In the following description, a number of power saving schemes for UEs to perform RRM measurements are disclosed. A UE may perform RRM measurements based on SSBs and additional cell-specific or UE-specific signal blocks. A BS may broadcast the information of availability of the additional signal blocks in Remaining Minimum System Information (RMSI).

The additional signal blocks and the SSBs may be diverse in frequency and/or in time. The additional signal blocks may be transmitted by the BS in a frequency channel different from the frequency channel of the SSBs. Alternatively, the additional signal blocks may be transmitted by the BS in a time slot (or symbol time) different from the time slot (or symbol time) of the SSBs. The use of the SSBs and the additional signal blocks enables the UE to complete each cycle of RRM measurements in a compacted time window. After a UE completes an RRM measurement, the UE may enter a sleep state (e.g., by shutting off some or most of its circuitry) when there is no signal to be transmitted or received.

In one embodiment, the UE performs Automatic Gain Control (AGC) tuning before each RRM measurement to adjust signal power. Each RRM measurement includes a cell search process, an SSB index (SBI) acquisition process, and an RSRP measurement period. Referring again to FIG. 2, the cell search process identifies the Cell ID from PSS 250 and SSS 260, the SBI may be carried by PBCH 270, and the RSRP may be measured from SSS 260. According to SSB-only RRM measurements, a UE may perform AGC tuning using a first SSB, and performs the RRM measurement using a second SSB. That is, the UE cannot go into a deep sleep in the time gap (TG1) between the first SSB and the second SSB. According to embodiments to be described below, a BS may broadcast an additional signal block which can be used by the UE to tune AGC. The UE then uses the next SSB for RRM measurement. In these embodiments, the UE may not go into deep sleep in the time gap (TG2) between the additional signal block and the next SSB. Power saving is achieved for the UE because TG2<TG1.

Figure 3:
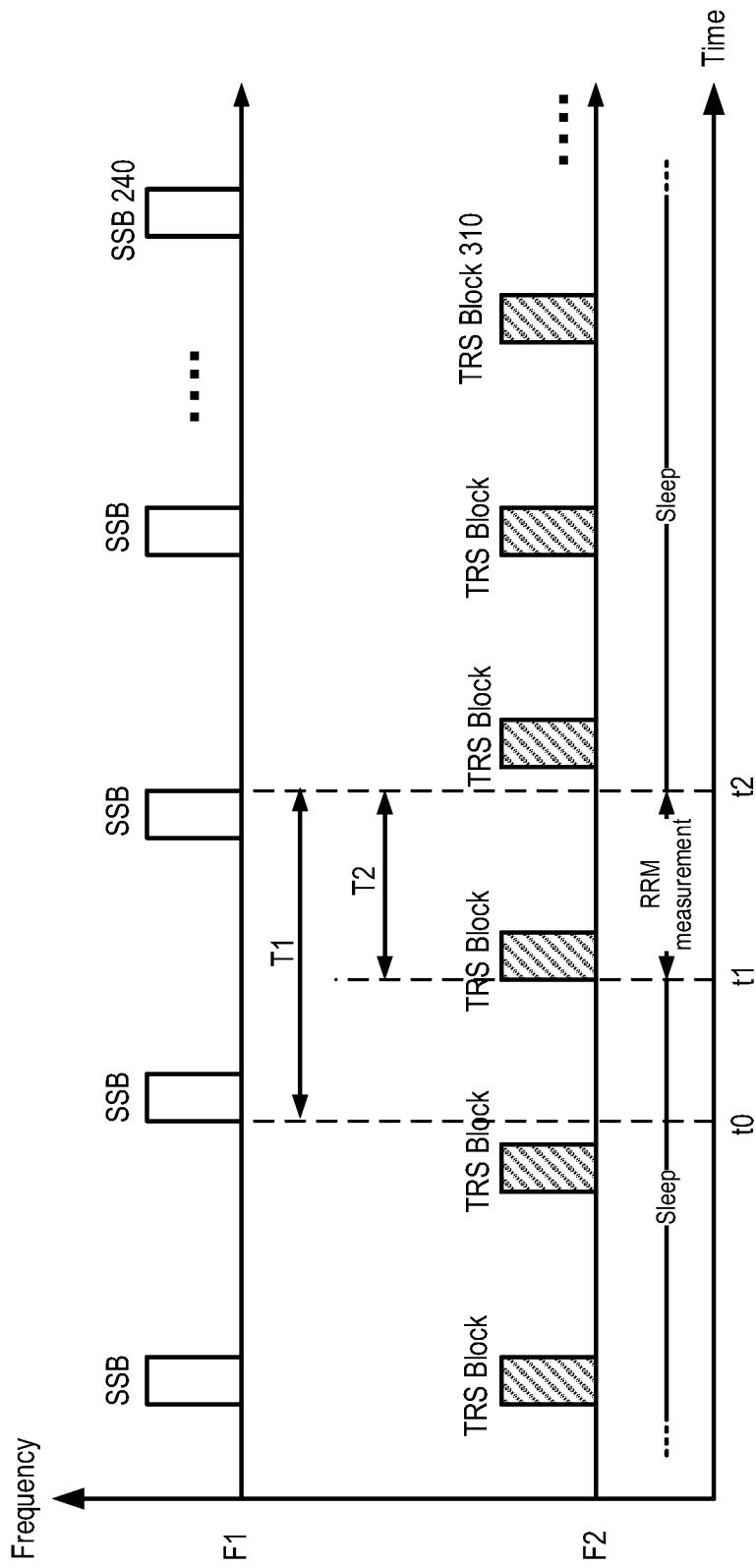
FIG. 3 is a diagram illustrating a power saving scheme for RRM measurements according to a first embodiment.

FIG. 3 is a diagram illustrating a power saving scheme for RRM measurements according to a first embodiment. In this embodiment, the aforementioned additional signal blocks are cell-specific, herein referred to as Tracking Reference Signal (TRS) blocks 310. For simplicity of the illustration, only one TRS block is numerically labeled in FIG. 3, however, it is understood that "TRS block 310" refers to any of the TRS blocks shown in FIG. 3. The sequence of TRS blocks 310 is a downlink cell-specific reference signal that is periodically broadcast by a BS to the connected mode UEs in the cell served by the BS. The connected mode UEs may use the time and frequency information carried by TRS blocks 310 to perform fine time and frequency tracking. The BS may broadcast no TRS when there are no connected mode UEs in its cell. TRS blocks 310 and SSB 240 may be transmitted in different frequency channels (e.g., F1 for SSB 240 and F2 for TRS blocks 310). In one embodiment, the cycle period of TRS blocks 310 may be shorter than the cycle period of SSBs 240.

Although an idle mode UE does not use TRS 310 for fine time and frequency tracking, the idle mode UE may use TRS blocks 310 in addition to SSBs 240 for RRM measurements. According to the first embodiment, an idle mode UE may use a TRS block 310 to tune the AGC, and then use a corresponding SSB 240 (e.g., the SSB 240 immediately following that TRS block 310 in time) for cell search, SBI acquisition and RSRP measurement. For example, the UE's RRM measurement window (including AGC tuning, cell search, SBI acquisition and RSRP measurement) has the length of time T2 (from t1 to t2) using one TRS block 310 and one SSB 240. By contrast, an RRM measurement window using two consecutive SSBs 240 would have the length of time T1 (from t0 to t2), which is longer than T2. Thus, the use of both TRS block 310 and SSB 240 compacts the processing timeline for the UE to perform RRM measurement. After the RRM measurement, the idle mode UE may re-enter a deep sleep state to save power.

In one embodiment, an idle mode UE may learn about configuration information (e.g., the time-and-frequency resource allocation) of TRS blocks 310 in RMSI from the BS. Alternatively, when an idle mode UE has the DRX mechanism activated, the information about TRS blocks 310 may be transmitted from the BS to the UE when the UE enters the DRX ON duration.

In one embodiment, TRS blocks 310 may be used by a UE allocated with a Component Carrier (CC) or a Bandwidth Part (BWP) without any SSBs configured. Such a UE may use one or more TRSs blocks 310 for AGC tuning and RRM measurements.

In some embodiments, the BS may transmit two or more cell-specific SSBs in two or more frequency channels. For example, a UE may receive a first SSB (SSB1) in a first frequency channel (F1) and a second SSB (SSB2) in a second frequency channel (F2). SSB2 may contain the same information as SSB1. The UE can use SSB2 in addition to SSB1 for RRM measurements. The timing of SSB1 and SSB2 may be the same or different. In alternative embodiments, instead of transmitting SSBs in multiple frequency channels, the BS may transmit standalone SSSs (also referred to as standalone SSS blocks) in addition to SSBs 240 for RRM measurements, where the standalone SSS blocks and SSBs 240 are transmitted in different frequency channels. The term "standalone" indicates that the BS transmits the standalone SSS without the other signals normally present in an SSB, such as PSS and PBCH.

Figure 4:
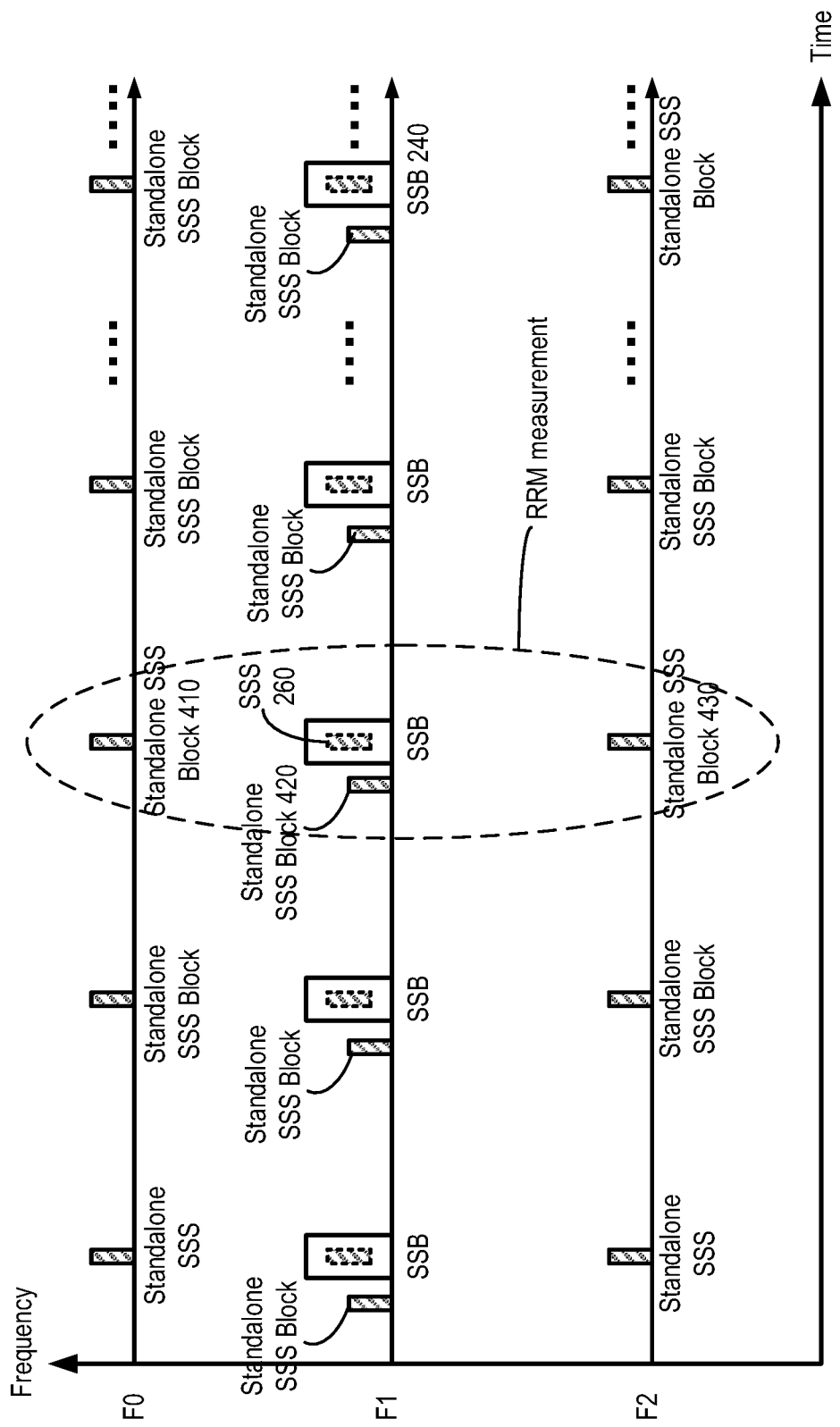
FIG. 4 is a diagram illustrating a power saving scheme for RRM measurements according to a second embodiment.

FIG. 4 is a diagram illustrating a power saving scheme for RRM measurements according to a second embodiment. The second embodiment may be applicable to both idle mode UEs and connected mode UEs. In this embodiment, the aforementioned additional signal blocks are standalone SSS blocks 410, 420, 430 or any combination thereof. For simplicity of the illustration, not all standalone SSS blocks are numerically labeled in FIG. 4, however, it is understood that "standalone SSS block 410" refers to any of the standalone SSS blocks in frequency F0, "standalone SSS block 420" refers to any of the standalone SSS blocks in frequency F1, and "standalone SSS block 430" refers to any of the standalone SSS blocks in frequency F2 shown in FIG. 4. In one embodiment, each of the standalone SSS block 410, 420 and 430 may carry the same content as the SSS 260 in the SSB 240.

In one embodiment, standalone SSS blocks 410, 420, 430 and SSBs 240 are cell-specific. Alternatively, standalone SSS blocks 410, 420 and 430 may be UE-specific. In the example of FIG. 4, standalone SSS blocks 410, 420 and 430 are transmitted in different frequency channels (e.g., F0, F1 and F3, respectively), while standalone SSS blocks 420 and SSBs 240 are transmitted in the same frequency channel (e.g., F1). It is understood that the UE may receive standalone SSS blocks from any number of frequency channels not limited to three. In one embodiment, a standalone SSS block 410 and/or 430 may be transmitted at the same symbol time as the SSS 260 in a corresponding SSB 240 (e.g., the SSB 240 most close to that standalone SSS block in time). In an alternative embodiment, a standalone SSS block 420 and the SSS 260 may be transmitted at different symbol times. The time and frequency information of cell-specific standalone SSS blocks 410, 420 and 430 may be transmitted from the BS to the UE in an RMSI from the BS. The time and frequency information of UE-specific standalone SSS blocks 410, 420 and 430 may be transmitted from the BS to the UE as configuration parameters when the UE is the connected mode or when the UE enters the DRX ON duration.

In one embodiment, standalone SSS blocks 410, 420 and 430 may be transmitted less frequently then SSBs 240 to minimize resource overhead. That is, the cycle period of standalone SSS blocks 410, 420 and 430 may be longer than the cycle period of SSBs 240. According to the second embodiment, the UE may use one or more standalone SSS blocks (e.g., 410 and/or 430) at the same time position (e.g., the same symbol time) as the corresponding SSB 240, but in different frequency channels from the corresponding SSB 240, to improve accuracy of the measurements with frequency diversity. With more accurate RRM measurements, a UE can measure fewer SSBs to save power. The reported RRM measurement is an averaged value of multiple RRM measurements; with frequency diversity, the same accuracy required by the specification may be achieved with fewer numbers of measurements for the average. For example, the UE may complete one RRM measurement using one SSB 240 at frequency channel F1 and standalone SSS blocks 410 and 430 at frequency channels F0 and F2, as indicated by the dotted ellipse. Thus, the RRM measurement window may have the length of one SSB, which is much shorter than using two consecutive SSBs as previously shown in FIG. 3. Shortening the RRM measurement time reduces the UE's power consumption and saves power.

Additionally or alternatively, the UE may shorten the RRM measurement time with time diversity by using SSBs 240 and standalone SSS blocks 420. For example, a UE may use a standalone SSS block 420 to tune the AGC, and then use a corresponding SSB 240 (e.g., the SSB 240 immediately following that standalone SSS block 420 in time) for cell search, SBI acquisition and RSRP measurement. The use of the standalone SSS block 420 may be combined with one or more frequency-diverse standalone SSS blocks, such as standalone SSS block 410 and/or 430.

Figure 5:
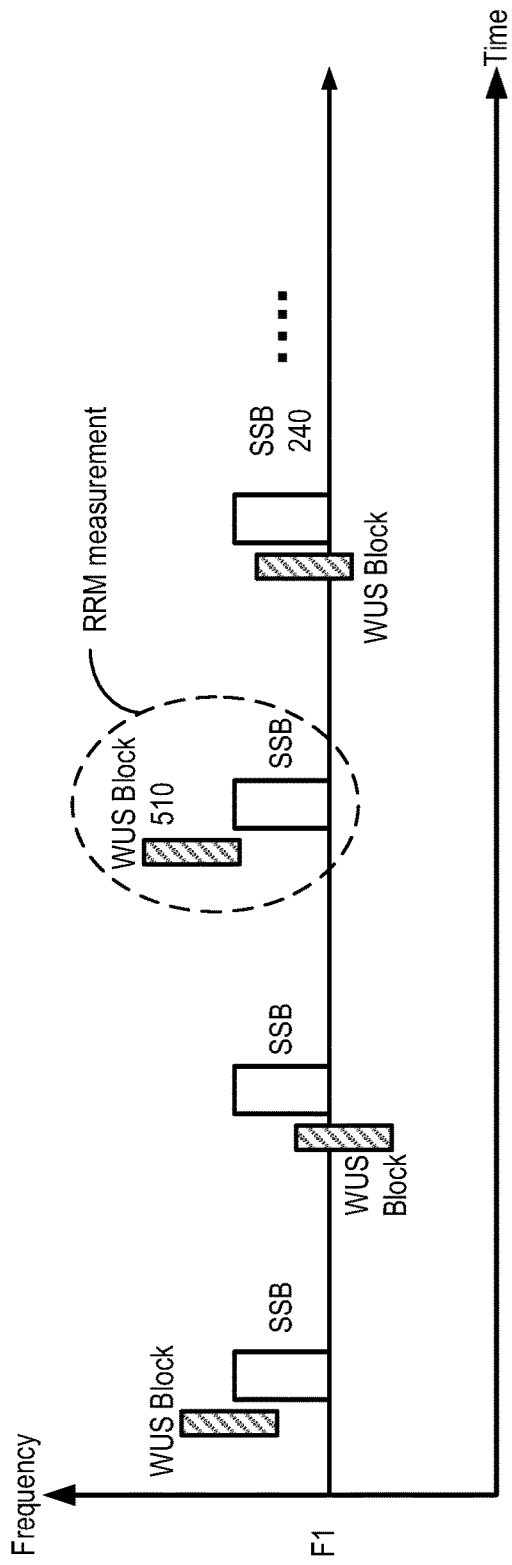
FIG. 5 is a diagram illustrating a power saving scheme for RRM measurements according to a third embodiment.

FIG. 5 is a diagram illustrating a power saving scheme for RRM measurements according to a third embodiment. In this embodiment, the aforementioned additional signal blocks are UE-specific wake-up signal (WUS) blocks 510. WUS blocks 510 are sent from a BS to wake up a UE from the idle mode. WUS blocks 510 may be used for paging indication, synchronization and measurements. In one embodiment, the BS may send WUS blocks 510 to wake up the UE and to prompt the UE to check and receive paging messages destined for the UE. According to the embodiment, WUS blocks 510 may be transmitted to the UE periodically; e.g., once every idle mode UE DRX cycle. In one embodiment, WUS blocks 510 may be transmitted less frequently then SSB 240 to minimize resource overhead. For simplicity of the illustration, only one WUS block 510 is numerically labeled in FIG. 5, however, it is understood that "WUS block 510" refers to any of the WUS blocks shown in FIG. 5.

The network may configure multiple monitoring occasions (i.e., time-frequency positions such as preconfigured symbol times and preconfigured frequency channels) for a UE to monitor. The UE monitors these time-frequency positions to find a WUS block 510, which can be transmitted in one of the configured occasions. Each WUS block 510 has a corresponding SSB 240 which is most close to it in time (an example is shown in the dotted ellipse in FIG. 5). A WUS block 510 and its corresponding SSB 240 may be transmitted at the same time but at different frequency channels, or at the same frequency channel but at different times, at different times and different frequency channels, at partially overlapping times and partially overlapping frequency channels, etc. The UE may receive the time and frequency configuration of WUS blocks 510 in RMSI from the BS. In one embodiment, the symbol time in which a WUS block 510 is transmitted precedes and is substantially adjacent to the symbol time in which its corresponding SSB 240 is transmitted. ABS may transmit a WUS block 510 in a frequency channel adjacent to or overlapping with the frequency channel in which an SSB 240 is transmitted. If the UE has DRX activated, the UE may receive the time and frequency configuration of WUS blocks 510 in DRX ON duration. In one embodiment, the UE may use one WUS block 510 for AGC tuning and one SSB 240 immediately following that WUS block 510 for the RRM measurement.

Figure 6:
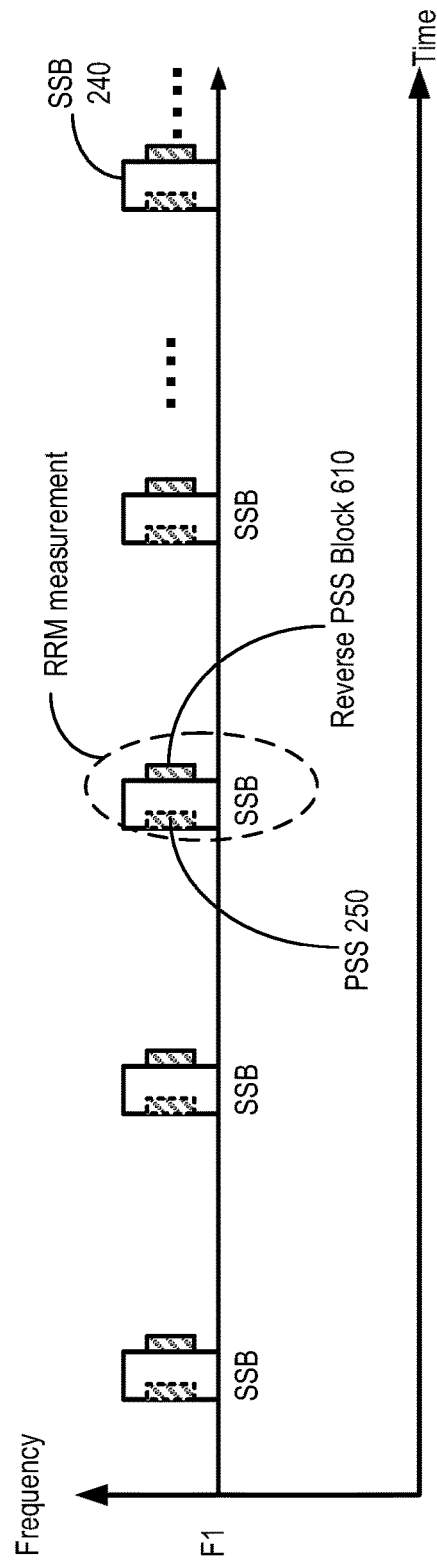
FIG. 6 is a diagram illustrating a power saving scheme for RRM measurements according to a fourth embodiment.

FIG. 6 is a diagram illustrating a power saving scheme for RRM measurements according to a fourth embodiment. In this embodiment, the aforementioned additional signal block is a reversed PSS block 610 appended to the end of an SSB 240 in time. The content of reversed PSS block 610 may be the same as PSS 250 in the SSB 240. For simplicity of the illustration, only one reversed PSS block 610 is numerically labeled in FIG. 6, however, it is understood that "reversed PSS block 610" refers to any of the reversed PSS blocks shown in FIG. 6.

As shown in FIG. 2, PSS 250 is the first symbol in each SSB 140. Thus, there is no extra symbol time before PSS 250 for a UE to perform AGC tuning. A UE that uses PSS 250 to perform AGC tuning might not be able to detect the Cell ID in one SSB 240. Reversed PSS block 610 can aid the UE to compensate for any loss due to AGC tuning using PSS 250 in the SSB 240. In one embodiment, the UE may use one reversed PSS block 610 for AGC tuning and a corresponding SSB 240 (e.g., the SSB 240 immediately before the reversed PSS block 610, as shown in the dotted ellipse) for the RRM measurement. Thus, the UE may be able to complete one RRM measurement in one SSB 240 plus the duration of one reversed PSS block 610.

It is noted that the time and the frequency allocated to SSBs and the additional signal blocks are not limited to the aforementioned examples. For example, the number of signal blocks in a predefined time span may be different from what is shown in FIGS. 3-6.

The embodiments described above utilize one or more additional signal blocks to aid the UE to perform RRM measurements in order to shorten the time spent on each RRM measurement. Another approach to power saving is to increase the cycle period for periodic RRM measurements. This approach may be combined with any of the aforementioned embodiments in which a UE utilizes additional signal blocks and SSBs for RRM measurements.

Figure 7:
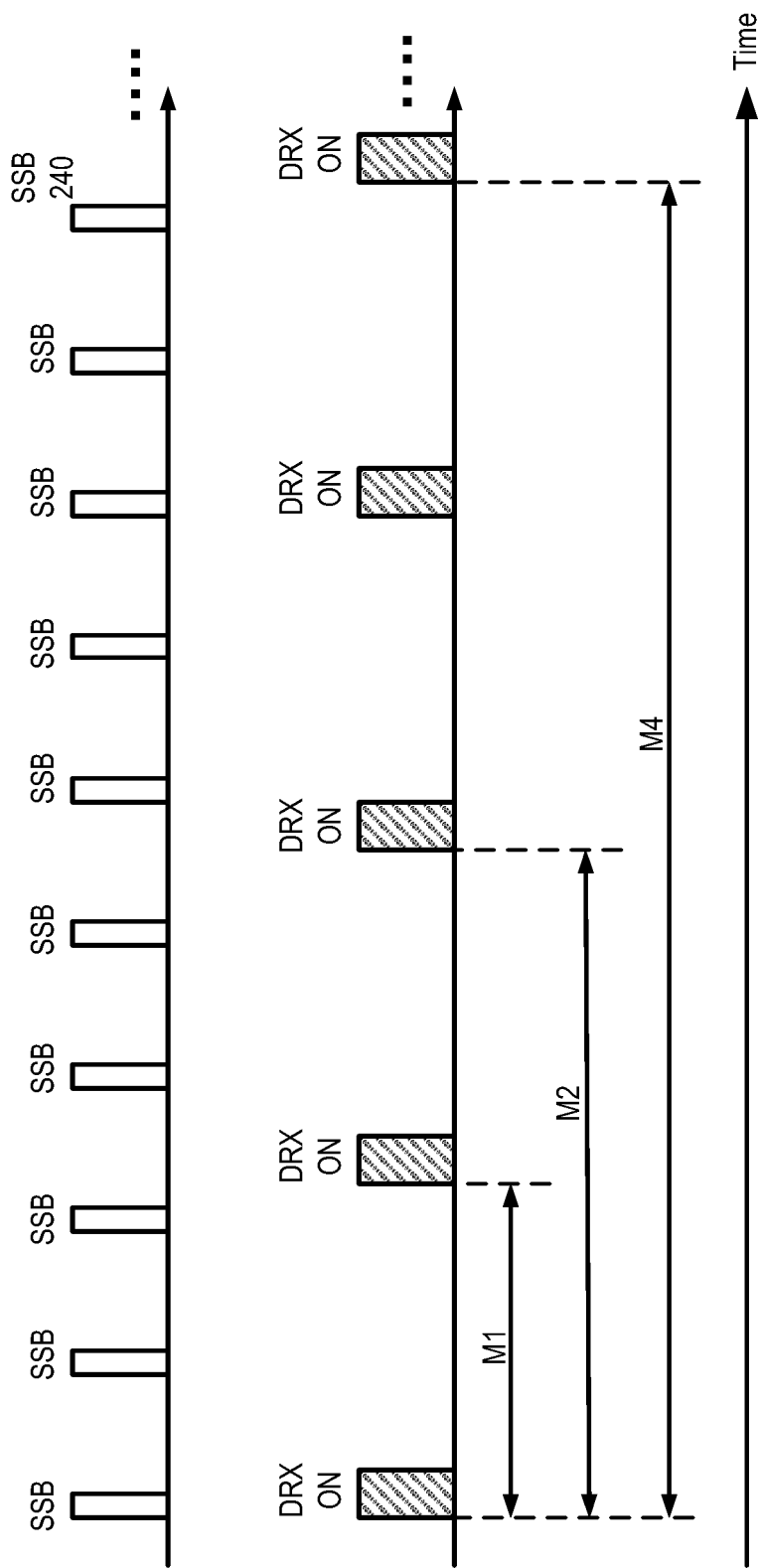
FIG. 7 is a diagram illustrating a power saving scheme for RRM measurements according to a fifth embodiment.

FIG. 7 is a diagram illustrating a power saving scheme for RRM measurements according to a fifth embodiment. FIG. 7 shows that the DRX cycle period is M1 (ms). A UE may perform RRM measurements at a cycle period equal to M1 by default. When a predefined condition is satisfied, the UE may be configured to perform RRM measurements at a relaxed cycle period; e.g., two times (M2) or four times (M4) of the DRX cycle period.

It is noted from FIG. 7 that a DRX cycle may not be aligned with an SSB cycle. That is, a UE may need to periodically receive and decode the SSBs, even when DRX is not on (e.g., in sleep). Thus, an idle mode UE needs to power up its circuitry not only in DRX ON duration, but also to receive SSBs for RRM measurements. Powering up the circuitry to receive SSBs for the purpose of RRM measurements consumes power.

In one embodiment, when the UE is in the connected mode, the predefined condition may be evaluated by the BS serving the UE. The BS then configures the UE's RRM measurement cycle period. When the UE is in the idle mode, the UE may evaluate the predefined condition according to one or more predefined rules, and then set its RRM measurement cycle period accordingly. The predefined condition may be set according to received signal quality, mobility of the UE, and/or other factors. For example, if the UE's received signal quality is above a low threshold, the RRM measurement cycle period may be set to two times the DRX cycle period. If the UE's received signal quality is above a high threshold, the RRM measurement cycle period may be set to four times the DRX cycle period. By performing RRM measurements less often, the UE may stay in the sleep mode longer and can save power.

In one embodiment, the DRX cycle period for a connected mode UE may be shorter than the DRX cycle period of an idle mode UE. The RRM measurement cycle period is set to be N times the DRX cycle period, where the DRX cycle period length depends on the mode of the UE.

Figure 8:
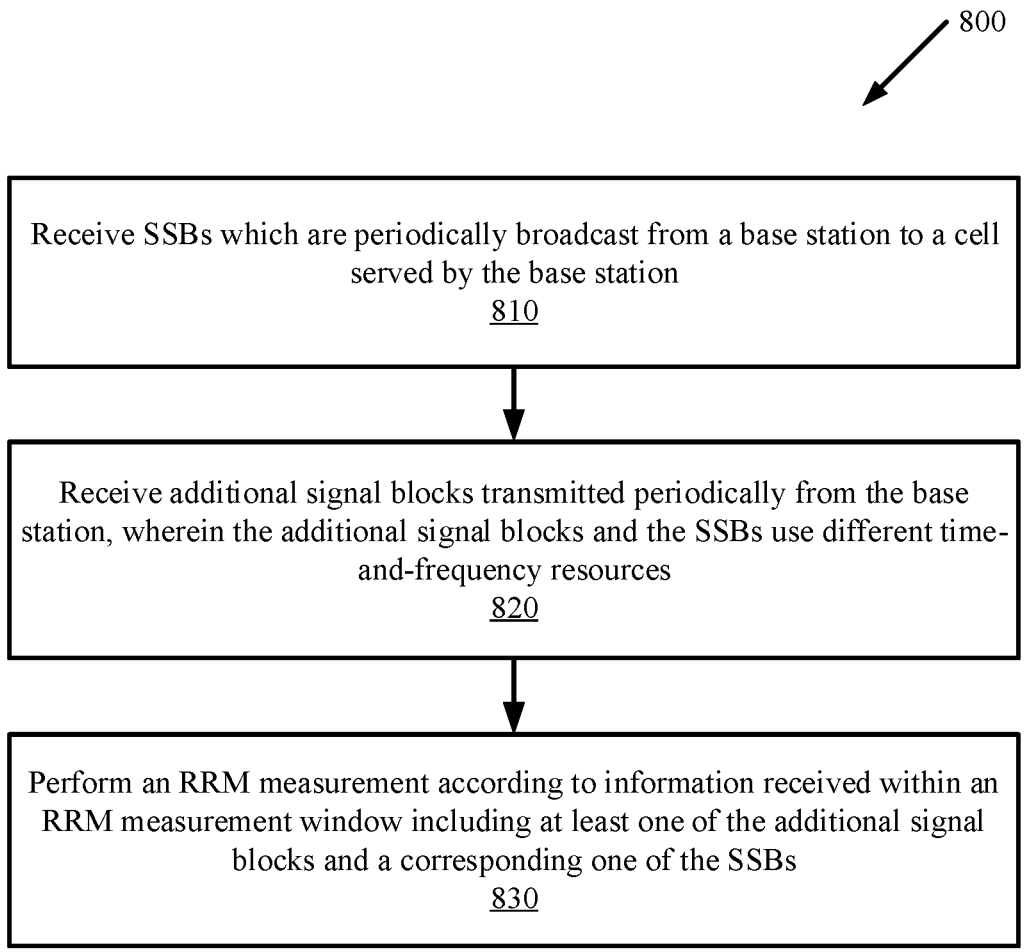
FIG. 8 illustrates a method performed by a UE in a wireless network for RRM measurements according to one embodiment.

FIG. 8 illustrates a method 800 performed by a UE in a wireless network for RRM measurements according to one embodiment; e.g., any of the aforementioned embodiments in FIGS. 3-6, as well as variations and extensions thereof. In one embodiment, the wireless network is a 5G NR network. In one embodiment, an example of the wireless network may be the network 100 of FIG. 1.

The method 800 starts at step 810 when the UE receives SSBs which are broadcast periodically from a base station to a cell served by the base station. At step 820, the UE receives additional signal blocks transmitted periodically from the base station. The additional signal blocks and the SSBs use different time-and-frequency resources. At step 830, the UE performs an RRM measurement according to information received within an RRM measurement window including at least one of the additional signal blocks and a corresponding one of the SSBs.

Figure 9:
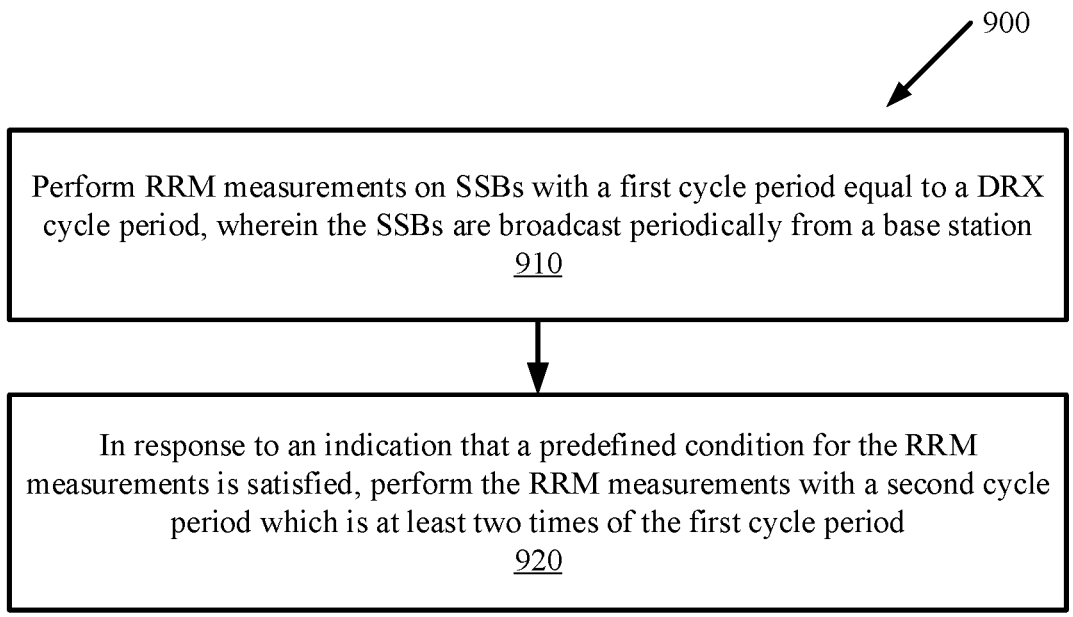
FIG. 9 illustrates a method performed by a UE in a wireless network for RRM measurements according to another embodiment.

FIG. 9 illustrates a method 900 performed by a UE in a wireless network for RRM measurements according to another embodiment; e.g., any of the aforementioned embodiments in FIG. 7, as well as variations and extensions thereof. In one embodiment, the wireless network is a 5G NR network. In one embodiment, an example of the wireless network may be the network 100 of FIG. 1.

The method 900 starts at step 910 when the UE performing RRM measurements on SSBs with a first cycle period equal to a DRX cycle period. The SSBs are broadcast periodically from a base station. In response to an indication that a predefined condition for the RRM measurements is satisfied, at step 920, the UE performs the RRM measurements with a second cycle period which is at least two times the first cycle period. In one embodiment, the second cycle period is two times of the DRX cycle period. In another embodiment, the second cycle period is four times of the DRX cycle period. In other embodiments, second cycle period may be N times of the DRX cycle period, where N is any number greater than two.

Figure 10:
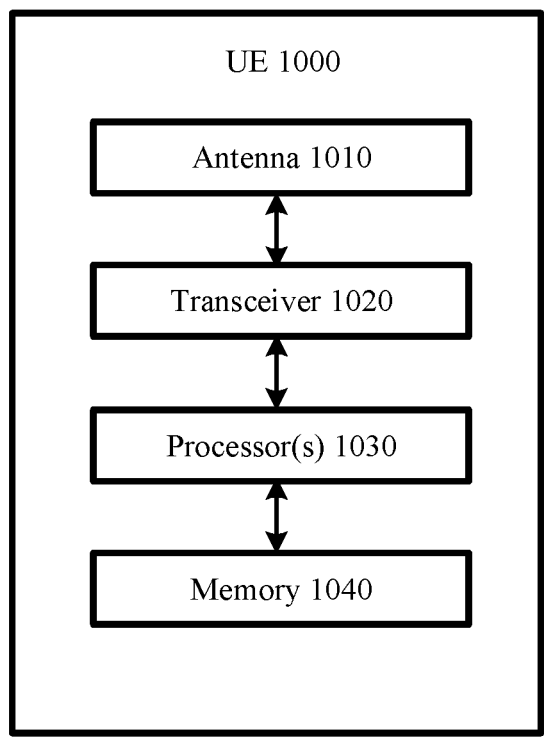
FIG. 10 is a block diagram illustrating elements of a UE operable to perform RRM measurements according to one embodiment.

FIG. 10 is a block diagram illustrating elements of a UE 1000 (also referred to as a wireless device, a wireless communication device, a wireless terminal, etc.) configured to provide uplink transmission according to one embodiment. As shown, the UE 1000 may include an antenna 1010, and a transceiver circuit (also referred to as a transceiver 1020) including a transmitter and a receiver configured to provide at least uplink and downlink radio communications with a base station of a radio access network. The UE 1000 may also include a processor circuit (which is shown as a processor 1030 and which may include one or more processors) coupled to the transceiver 1020. The processor(s) 1030 may include one or more processor cores. The UE 1000 may also include a memory circuit (also referred to as memory 1040) coupled to the processor 1030. The memory 1040 may include computer-readable program code that when executed by the processor 1030 causes the processor 1030 to perform operations according to embodiments disclosed herein, such as the method 800 in FIG. 8 and the method 900 in FIG. 9. The UE 1000 may also include an interface (such as a user interface). It is understood the embodiment of FIG. 10 is simplified for illustration purposes. Additional hardware components may be included.

Although the UE 1000 is used in this disclosure as an example, it is understood that the methodology described herein is applicable to any computing and/or communication device capable of transmitting uplink signals to a base station.

The operations of the flow diagrams of FIGS. 8 and 9 have been described with reference to the exemplary embodiments of FIGS. 1 and 10. However, it should be understood that the operations of the flow diagrams of FIGS. 8 and 9 can be performed by embodiments of the invention other than the embodiments of FIGS. 1 and 10, and the embodiments of FIGS. 1 and 10 can perform operations different than those discussed with reference to the flow diagrams. While the flow diagrams of FIGS. 8 and 9 show a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits, or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method performed by a user equipment (UE) in a wireless network for Radio Resource Management (RRM) measurements, comprising:
    performing RRM measurements on Synchronization Signal Blocks (SSBs) with a first cycle period equal to a Discontinuous Reception (DRX) cycle period, wherein the SSBs are broadcast periodically from a base station; and
    in response to an indication that a predefined condition for the RRM measurements is satisfied, performing the RRM measurements with a second cycle period which is at least two times of the first cycle period, wherein a length of the second cycle period is determined by the UE based on, at least in part, results of the RRM measurements and a set of predefined rules.

2. The method of claim 1, wherein the second cycle period is two times the first cycle period.

3. The method of claim 1, wherein the second cycle period is four times the first cycle period.

4. The method of claim 1, further comprising:
    receiving, by the UE, a downlink signal from the base station indicating a length of the second period when the UE is in a connected mode.

5. The method of claim 1, further comprising:
    evaluating, by the UE, the predefined condition according to a set of rules to determine a length of the second period when the UE is in an idle mode.

6. The method of claim 1, wherein the wireless network is a Fifth Generation New Radio (5G NR) network.

7. The method of claim 1, further comprising:
    receiving the SSBs with a periodicity equal to a first time interval;
    receiving an additional signal in a signal sequence transmitted periodically from the base station, wherein the signal sequence and the SSBs use different time-and-frequency resources, and wherein the additional signal and a corresponding one of the SSBs are apart by a second time interval less than the first time interval; and
    performing an RRM measurement using the corresponding SSB and the additional signal within an RRM measurement window that has a length less than the first time interval.

8. The method of claim 7, wherein the additional signal is a cell-specific Tracking Reference Signal (TRS) transmitted periodically from the base station.

9. The method of claim 7, wherein the additional signal is a standalone Secondary Synchronization Signal (SSS), which has a same content as an SSS in the corresponding SSB and transmitted in a frequency channel different from the corresponding SSB.

10. The method of claim 7, wherein the additional signal is a wake-up signal transmitted periodically from a base station specifically to the UE.

* * * * *